United States Patent
Matson-Dekay et al.

(10) Patent No.: US 10,554,792 B2
(45) Date of Patent: Feb. 4, 2020

(54) MULTIDIRECTIONAL SERIAL-ETHERNET DATA CONVERSION APPARATUS

(71) Applicant: Synq Access + Security Technology Ltd., Victoria (CA)

(72) Inventors: Casey Matson-Dekay, Victoria (CA); Joshua Rodriguez, Victoria (CA); Vince Geisler, Victoria (CA); Nolan Wheeler, Victoria (CA)

(73) Assignee: SYNQ ACCESS + SECURITY TECHNOLOGY LTD., Victoria, B.C. (CA)

( * ) Notice: Subject to any disclaimer, the term of this patent is extended or adjusted under 35 U.S.C. 154(b) by 0 days.

(21) Appl. No.: 15/705,509

(22) Filed: Sep. 15, 2017

(65) Prior Publication Data
US 2018/0084089 A1    Mar. 22, 2018

(30) Foreign Application Priority Data
Sep. 16, 2016    (CA) ..................... 2942079

(51) Int. Cl.
*G06F 13/00*    (2006.01)
*H04L 29/06*    (2006.01)
*H04W 4/80*    (2018.01)
*H04W 84/12*    (2009.01)

(52) U.S. Cl.
CPC .............. *H04L 69/08* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 6,881,096 B2 | 4/2005 | Brown et al. | |
| 7,018,242 B2 | 3/2006 | Brown et al. | |
| 9,081,903 B2 | 7/2015 | Biondi et al. | |
| 2005/0097369 A1* | 5/2005 | Bowser | H04L 12/10 713/300 |
| 2005/0154799 A1 | 7/2005 | Feng et al. | |
| 2007/0028018 A1 | 2/2007 | Giroud et al. | |
| 2007/0091168 A1* | 4/2007 | Lee | H04N 7/163 348/14.01 |
| 2008/0276032 A1* | 11/2008 | Iida | G06F 3/0619 710/316 |
| 2009/0180421 A1* | 7/2009 | Hall | H04B 7/18515 370/316 |

(Continued)

FOREIGN PATENT DOCUMENTS

| | | |
|---|---|---|
| CN | 1536776 A | 10/2004 |
| CN | 101673107 A | 3/2010 |

*Primary Examiner* — Brandon M Renner
(74) *Attorney, Agent, or Firm* — David & Bujold PLLC; Michael J. Bujold

(57) ABSTRACT

A serial interface-Ethernet interface data conversion apparatus includes a printed circuit board, a microcontroller controlling operations on the printed circuit board and a power input connection for providing power to components on the printed circuit board. One or more serial interface is provided along with an Ethernet interface. The microcontroller is programmed to convert a signal input received via the one or more serial interface to a signal output via one of the Ethernet interface and to convert a signal input received via the Ethernet interface to a signal output via the one or more serial interface.

6 Claims, 4 Drawing Sheets

(56) References Cited

U.S. PATENT DOCUMENTS

| | | | |
|---|---|---|---|
| 2009/0196621 A1 | 8/2009 | Chen | |
| 2010/0030925 A1* | 2/2010 | Inoue | G06F 3/1204 710/16 |
| 2011/0026525 A1* | 2/2011 | He | H04L 49/351 370/392 |
| 2011/0265156 A1* | 10/2011 | Bombay | G06F 21/34 726/5 |
| 2012/0191894 A1* | 7/2012 | Sasaki | G06F 13/387 710/313 |
| 2014/0354888 A1* | 12/2014 | Nakamura | H04N 5/64 348/725 |
| 2015/0311753 A1* | 10/2015 | Scifres | H02J 13/0096 713/300 |
| 2017/0069214 A1* | 3/2017 | Dupray | G08G 5/0021 |
| 2017/0154001 A1* | 6/2017 | Filser | G06F 13/4022 |

\* cited by examiner

MULTIDIRECTIONAL SERIAL-ETHERNET DATA CONVERSION APPARATUS

FIELD

There is described an apparatus that enables real-time conversion and transmission of data between Serial protocols and Ethernet protocols. The real-time conversion can be expanded to also include radio protocols.

BACKGROUND

There are many examples of Serial to Ethernet conversion. By way of example, U.S. Pat. No. 6,881,096 (Lantronix, Inc.) titled "Compact serial-to-ethernet conversion port", describes the method by which Serial data signals may be converted to Ethernet, and vice versa. By way of U.S. Patent 20090196621 A1, titled "Fiber-optic to USB Ethernet converter", which aims to describe high-speed data conversion from USB data signals to Ethernet data signals.

Many systems exist in the retail, industrial, and scientific field, which utilize the Serial interface as their primary method of communication between devices. A good example of this is in the retail market, where nearly all businesses utilize barcode readers, which scan the barcode on the product and transmit them to the computer system used by the business. The technology in this patent would enable store owners to monitor the data passing through the barcode reader, and even send barcode data to other computer systems when there is no physical barcode reader connected. Considering that sensitive information, such as credit-card numbers, are not transmitted over these interfaces, it provides a safe method of collecting analytic data without risking the privacy of the user.

Many systems transmit and receive information via the Serial interface known as RS-232. RS-232, RS-485, etc . . . are the primary protocols that this patent aims to convert to other protocols, but is not limited to these protocol.

SUMMARY

The feasibility of Serial and USB to Ethernet conversion has been well established. There exist integrated circuits which may be used to convert serial and USB signals to Ethernet. While this has been well established, there exist no systems which can convert data streams bi-directionally between multiple interfaces. We propose a system which provides multi-directional communication between a Serial interface and an Ethernet interface. The real-time conversion can also include radio protocols. There can also be optional data modification before converting between interfaces.

There is provided a Serial-Ethernet data conversion apparatus which includes a printed circuit board, a microcontroller controlling operations on the printed circuit board and a power input connection for providing power to components on the printed circuit board. One or more serial interface is provided along with an Ethernet interface. The microcontroller is programmed to convert a signal input received via the one or more serial interface to a signal output via one of the Ethernet interface and to convert a signal input received via the Ethernet interface to a signal output via the one or more serial interface.

The utility of the apparatus may be expanded by also providing one or more radio communications interfaces, such as but not limited to, WiFi or Bluetooth.

Using a variety of discreet integrated circuits (ICs) connected together on a printed circuit board (PCB), the Serial data or Radio data is converted to Ethernet packets, which can be transmitted over now-ubiquitous Ethernet connections to computers in the same location, or even across long distances (such as between countries). Other interfaces may be added to the device, and data flow from any interface to any other interface may occur.

The conversion system consists of a PCB with appropriate interface connectors, a power jack, and interface for programming the device. The PCB also has IC packages soldered onto the surface of the PCB, which provide the functionality of the board.

The PCB has a programming interface which allows software to be loaded onto the microcontroller. This software defines under what circumstances the board should send data to the target address on the Ethernet system, and controls systems such as the power management sub-circuit. The software may also modify data on the fly while transmitting it from one interface to another. For example, a device monitoring Serial data from a printer and converting it to Ethernet packets may ignore all data not relevant to the specific application.

The system can also contain the necessary components to utilize Power over Ethernet technologies, which eliminate the need for a power connector, and provide power to the device via the Ethernet connection, if the Ethernet network utilizes the feature.

With the systems in place with the previously referenced patents, there exist only half-duplex communication between interfaces. This means that the two interfaces in question (eg: Serial and Ethernet, or USB and Ethernet) may only transmit data from one interface to the other at the same time. Two streams of data, from A to B and B to A simultaneously, is not possible. Furthermore, previous systems are not pass-through, meaning that data passing through the interfaces ends at the device, and does not continue through the device to another plug of the same interface. Our proposed system would have no limits on how the data may be transmitted. For example, data coming in from the USB jack could be sent to the Serial jack, as well as the Ethernet jack. It could even be sent to other devices via the Ethernet connection, and data coming in through the USB connection could fan out (via Ethernet) to 5 devices on the network, where the data is then piped out of the Serial jack. The combinations do not have limit, and are defined by the software uploaded to the device via the programming header. This is the main differentiating factor between this device and previous patents.

In addition, due to the configuration of the ICs on the PCB, certain connections may be electrically isolated from others. This would enable the device to be electrically "invisible" under certain circumstances. This means that the system being monitored electrically behaves no differently than if the monitor was not connected at all. This is accomplished by having this apparatus placed inline between the sending and receiving device. The pass-through feature allows for the devices to communicate unimpeded, while a digital copy of the interaction is created and used as defined by the loaded software.

The apparatus described enables the device to passively monitor interface connections, or act as a system which intercepts the signals and modifies the data before passing it along to other interfaces. The behavior of the device is defined by the software and may be changed at any time without hardware modification. Data interception would allow, for example, a printing system to become paperless by re-rerouting print jobs to a database. This would remove the need to physically print the information in question, but data would still be stored electronically, and would require no modifications of the host system besides installing the device between the host computer and the printer.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
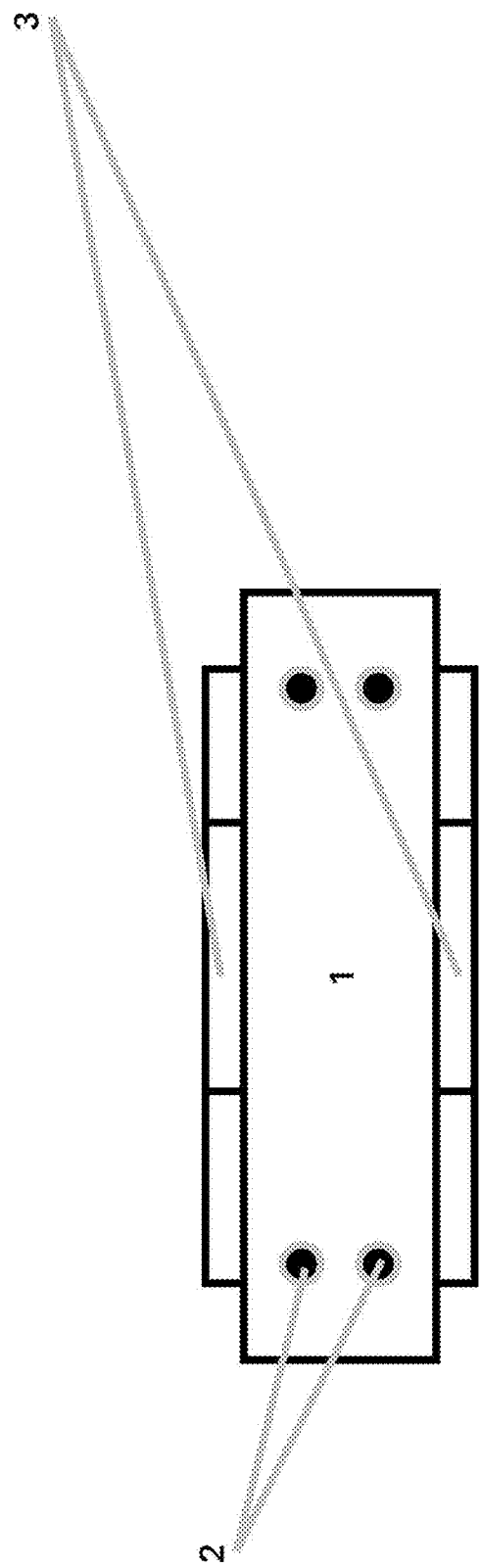
FIG. 1 is an overview of the device geometry.

Structure and Relationship of Parts:

Referring to FIG. 1, the PCB (1) connects the various components together via wires embedded into the PCB. The PCB also provides functional strength to the ports (3) mounted on the device. Mounting holes (2) provide a way to affix the device to a wall or floor.

Figure 2:
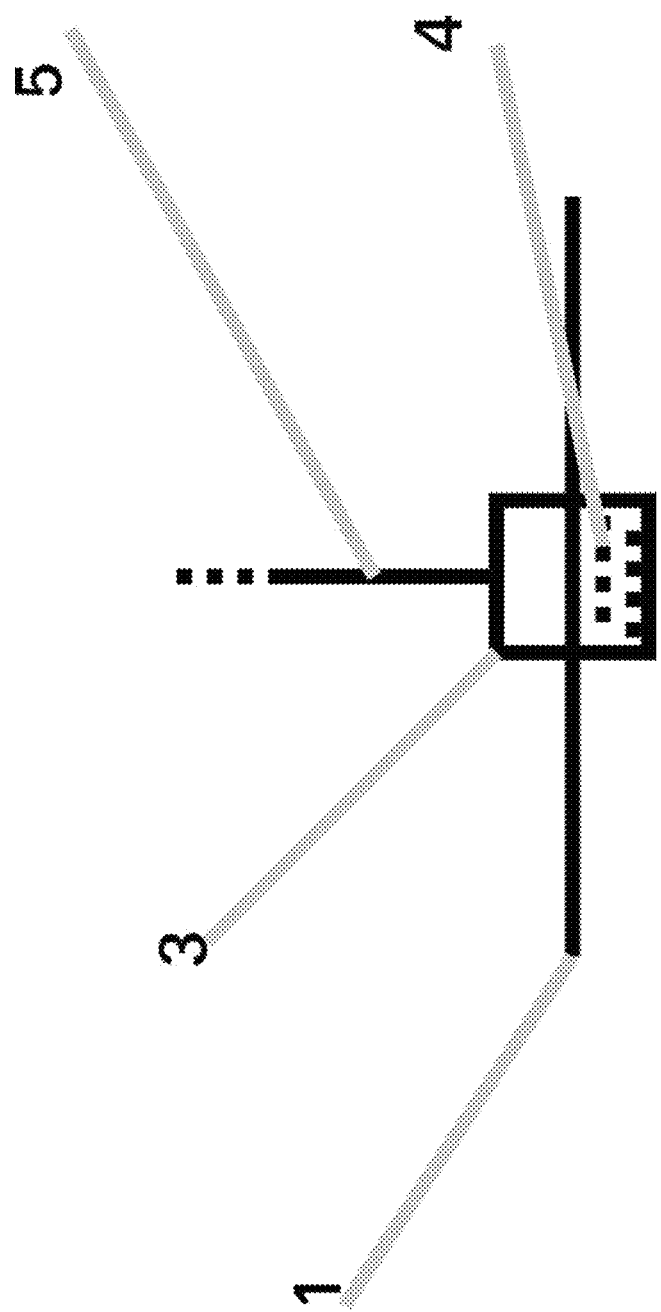
FIG. 2 is a top view of an interface connection.

Referring to FIG. 2, the interface port (3) provides bi-directional data flow for a given interface. The data is relayed to the port from the microcontroller, and the data processed accordingly. The port (3) is mounted to the PCB (1) via soldering connections (4), which connect to wires (5) which are bundled together and leave the board.

Figure 3:
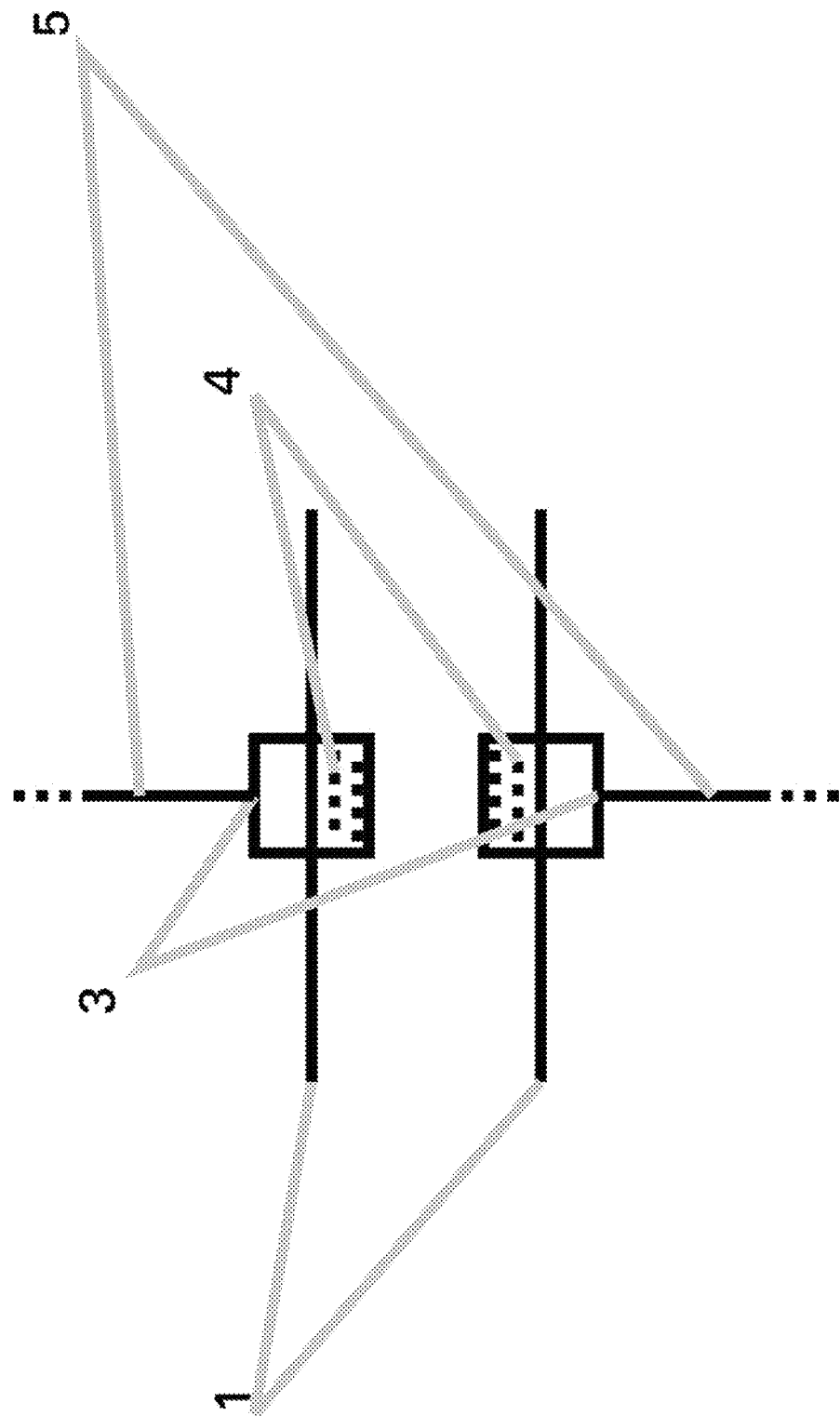
FIG. 3 is a top view of a bi-directional interface connection.

Referring to FIG. 3, the interface ports (3) provide uni-directional, pass-through data flow for a given interface. The ports relay data to the microcontroller via wires embedded in the PCB (1). This enables the data to flow through the device via soldering connections (4), where the data is siphoned off, but also continue through the board to the target device that the host system was originally connected to. This is not limited to two ports, it may contain more or less in the design. The ports are mounted to the PCB (1), where data flows through the connections (4) to the port (3), and enter and leave the device via wires (5) bundled together and connected to the port.

Figure 4:
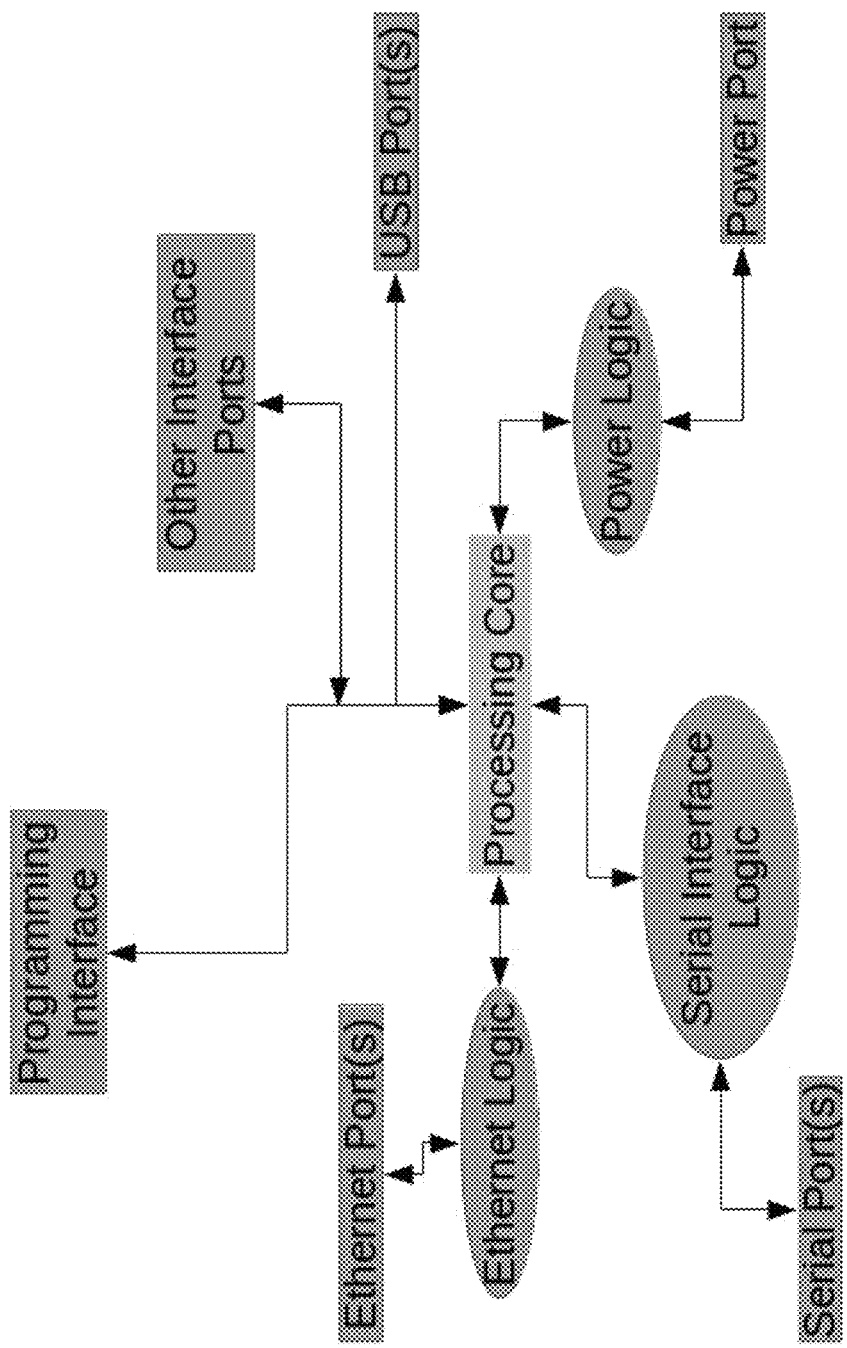
FIG. 4 is a functional diagram of the connections between interfaces.

Referring to FIG. 4, the functional block diagram shows the relationships between the components on the PCB. These functional relationships are defined by the connections between the discreet integrated circuits soldered onto the PCB.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

LIST OF COMPONENTS

1. Printed circuit board (PCB)
2. Mounting holes
3. Interface ports
4. Soldering connections
5. Connective wires
6. Integrated Circuits The scope of the claims should not be limited by the illustrated embodiments set forth as examples, but should be given the broadest interpretation consistent with a purposive construction of the claims in view of the description as a whole.

What is claimed is:

1. A multidirectional serial-Ethernet data conversion apparatus, comprising:
   a printed circuit board with connections to facilitate a flow through of data;
   a power input connection for providing power to components on the printed circuit board;
   one or more serial interface;
   one or more Ethernet interface;
   a microcontroller for controlling operations on the printed circuit board, during a first operational behaviour, the microcontroller controls the printed circuit board to permit the flow through of data without any modification of the data, and during a second operational behaviour, the microcontroller controls the printed circuit board to modify the data flowing through the printed circuit board;
   the microcontroller being programmed, while operating in the first behaviour, so that the data flows through the printed circuit board without any modification to the data and the data is converted, as necessary, from one of the one or more serial interface or one of more Ethernet interface to another of the one or more serial interface or one of more Ethernet interface;
   the microcontroller being programmed, while operating in the second behaviour, so that the data flows through the printed circuit board is modified and converted, as necessary, from one of the one or more serial interface or one of more Ethernet interface to another of the one or more serial interface or one of more Ethernet interface; and
   the microcontroller being programmed to make a digital copy of all data passing through all interfaces regardless of the whether operating in the first operating behaviour or the second operating behaviour.

2. The apparatus of claim 1, wherein the microprocessor is programmed to concurrently process multiple data two way flows through the printed circuit board.

3. The apparatus of claim 1, wherein power is provided by power over Ethernet.

4. The apparatus of claim 1, wherein there is included one or more radio communications interfaces.

5. The apparatus of claim 1, wherein the microprocessor is connected to a printer with the digital copy being made of all data passing to the printer.

6. The apparatus of claim 5, wherein the microprocessor is programmed, while operating in the second behaviour, to modify the data flow sent to the printer.

* * * * *